(12) United States Patent
Edwards

(10) Patent No.: US 11,343,089 B2
(45) Date of Patent: May 24, 2022

(54) CRYPTOGRAPHY SYSTEM AND METHOD

(71) Applicant: Tunnel VUE Inc., Montgomery, AL (US)

(72) Inventor: Nicholas Ross Edwards, Montgomery, AL (US)

(73) Assignee: Tunnel VUE Inc., Montgomery, AL (US)

( * ) Notice: Subject to any disclaimer, the term of this patent is extended or adjusted under 35 U.S.C. 154(b) by 7 days.

(21) Appl. No.: 16/924,870

(22) Filed: Jul. 9, 2020

(65) Prior Publication Data

US 2021/0014054 A1 Jan. 14, 2021

Related U.S. Application Data

(60) Provisional application No. 62/872,378, filed on Jul. 10, 2019, provisional application No. 62/945,970, filed on Dec. 10, 2019.

(51) Int. Cl.
*H04L 9/08* (2006.01)
*H04L 9/32* (2006.01)
*H04L 29/06* (2006.01)

(52) U.S. Cl.
CPC .......... *H04L 9/0861* (2013.01); *H04L 9/0822* (2013.01); *H04L 63/0478* (2013.01)

(58) Field of Classification Search
CPC .. H04L 9/0861; H04L 9/0822; H04L 63/0478
See application file for complete search history.

(56) References Cited

U.S. PATENT DOCUMENTS

| | | | | |
|---|---|---|---|---|
| 9,614,669 B1* | 4/2017 | Cox, Jr. | ............... | H04L 63/0435 |
| 10,243,732 B1* | 3/2019 | Herzerg | ................ | H04L 9/0861 |
| 2010/0070767 A1* | 3/2010 | Walker | .................... | H04L 9/083 |
| | | | | 713/169 |
| 2014/0052979 A1* | 2/2014 | Stella | ........................ | H04L 9/14 |
| | | | | 713/150 |
| 2014/0245411 A1* | 8/2014 | Meng | ...................... | H04L 63/08 |
| | | | | 726/7 |
| 2015/0188887 A1* | 7/2015 | Thomas | .............. | H04L 63/0272 |
| | | | | 713/153 |
| 2015/0326547 A1* | 11/2015 | Carlson | ................. | H04L 63/061 |
| | | | | 713/171 |
| 2016/0352706 A1* | 12/2016 | Peeters | ................. | H04L 63/062 |
| 2017/0238172 A1* | 8/2017 | Benoit | .................. | G06F 21/606 |
| | | | | 380/270 |

(Continued)

OTHER PUBLICATIONS

Anonymous, "Double Key Encryption (DKE)," Microsoft 365 Compliance, 20 pages (2020).

(Continued)

*Primary Examiner* — Darshan I Dhruv

(57) ABSTRACT

A cryptography system for the protection of data in transit using a post-quantum encryption key management system that eliminates the need for PKI or other asymmetric key management systems used in today's solutions, while allowing encryption of data in transit with no hands-on management including configuration of routers, switches, etc. The present system includes a multi-factor post-quantum key management mechanism that strengthens existing symmetric encryption systems and industry standard key generators on existing hardware through the post-quantum age.

17 Claims, 7 Drawing Sheets

(56) References Cited

U.S. PATENT DOCUMENTS

| | | | |
|---|---|---|---|
| 2018/0123789 A1* | 5/2018 | Merli | H03K 19/17768 |
| 2018/0198770 A1* | 7/2018 | Gremaud | H04L 63/068 |
| 2018/0337772 A1* | 11/2018 | Acar | G06F 21/64 |
| 2019/0007383 A1* | 1/2019 | Vallieres | H04L 9/0866 |
| 2019/0238332 A1* | 8/2019 | Ono | H04L 9/0861 |
| 2020/0242711 A1* | 7/2020 | Cao | H04L 9/0822 |
| 2020/0320227 A1* | 10/2020 | Sadjadpour | H04L 9/0861 |
| 2020/0344055 A1* | 10/2020 | Topps | H04L 9/0822 |
| 2020/0374944 A1* | 11/2020 | Lampin | H04W 12/088 |

OTHER PUBLICATIONS

Cimpanu, C., "Microsoft Double Key Encryption Enters Public Preview," Zero Day, 1-5 (2020).

* cited by examiner

CRYPTOGRAPHY SYSTEM AND METHOD

RELATED APPLICATIONS

This application claims the benefit under 35 USC 119(e) of U.S. Provisional Application No. 62/872,378, filed on Jul. 10, 2019 and U.S. Provisional Application No. 62/945,970, filed on Dec. 10, 2019, both of which are incorporated herein by reference in their entirety.

BACKGROUND OF THE INVENTION

With the emergence of quantum computers in today's world, the risk to asymmetric encryption rapidly increases, due to its susceptibility to Shor's algorithm that uses integer factorization to derive the key. The tactic for today's current industry standard methodology for breaking encryption is that it looks for underlying patterns of characters that compose the encrypted message.

Shor's Algorithm is effective on asymmetric encryption due to its ability to perform integer factorization to derive primes. This allows Shor's algorithm to solve asymmetric encryptions in polynomial time. Thus, asymmetric keys have an effective key space of nearly zero bits when solved with quantum computing.

Grover's Algorithm is also effective on symmetric encryption such as advanced encryption standard (AES). It can reduce the key space to the square root of its effective space through the use of unstructured search of a brute force attack through amplitude amplification using differing states to search for a result that is known. This drastically reduces the effective key strength of existing symmetric encryption methodologies.

SUMMARY OF THE INVENTION

The present cryptography system can simplify the protection of data in transit using a post-quantum encryption key management system that eliminates the need for public key infrastructure (PKI) or other asymmetric key management systems used in today's solutions, while allowing encryption of data in transit with no hands-on management including configuration of routers, switches, etc.

The present system includes a multi-factor post-quantum key management mechanism that strengthens existing symmetric encryption systems and industry standard key generators on existing hardware through the post-quantum age. Until "P versus NP" is solved, the present system faces no significant mathematical vulnerabilities including all current publicly available algorithms.

The present system uses a multifactor postquantum method that wraps each packet in an encrypted session (including the very first packet) with a separately-established, unique key for each session and a unique key for every packet within each session, making it impossible to be broken by quantum computers. The system's key manager does not care about the key size and has no limitation on the size of the code or the size of the key. The only limitations are the ones set by users.

In general, according to one aspect, the invention features a cryptography method comprising encrypting each original packet with a packet key within each session and wrapping each encrypted original packet in an encrypted session with a separately-established, session key for each session to produce a send packet.

Preferably, the encrypted original packet is combined with a packet salt prior to encryption with the session key and the packet salt is typically not encrypted with the packet key.

In the embodiment, the session key for a session is derived from an ancestor key and the ancestor key is replaced each time a session resets.

Further, the packet key could change for each packet.

In the embodiment, an ancestor key is divided into two parts and used to create the session key and the packet key and the ancestor key is derived from the previous session key.

In general, according to one aspect, the invention features an encrypted tunnel system, comprising two servers communicating over a public network. These servers encrypt each original packet received from their respective local area networks with a packet key within each session and wrap each encrypted original packet in an encrypted session with a separately-established session key for each session to produce a send packet that is transmitted over the public network to the other server.

The present system does not need to use any form of asymmetric encryption or its derivative Public Key Infrastructure (PKI) for key management and exchange.

Due to the dynamic multi-factor encryption key management, it mathematically appears as an NP-Complete problem matching the description of a Boolean Satisfiability Problem.

If Grover's algorithm were applicable to the present key management methodology, it would suffer only 50% of the standard reduction generally associated with Grover's Algorithm due to the double-wrapped dynamic encryption used. This changes the reduction of a 256-bit key from 128 to 192 allowing existing AES encryption to maintain an additional 64 bits of entropy in the key. This is possible because every iteration of the session key requires the algorithm to run through the entire space of the second key to determine if it is a valid key or not. But due to the nature of the present dynamic packet key the current implementation of Grover's Algorithm is not applicable to the present methodology because the implementation of a unique session key over a dynamic packet key creates a one time pad that is multi-factored where the solution to the session key which must be determined first and reversed results in an encrypted message that requires running through all iterations of the dynamic packet key. Since the dynamic packet key changes with each packet, there are no underlying commonalities or visibly shared structure between packets to aid in the decryption of the session key. Since Grover's Algorithm cannot search for what it doesn't know to look for, it does not apply to the present methodology.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
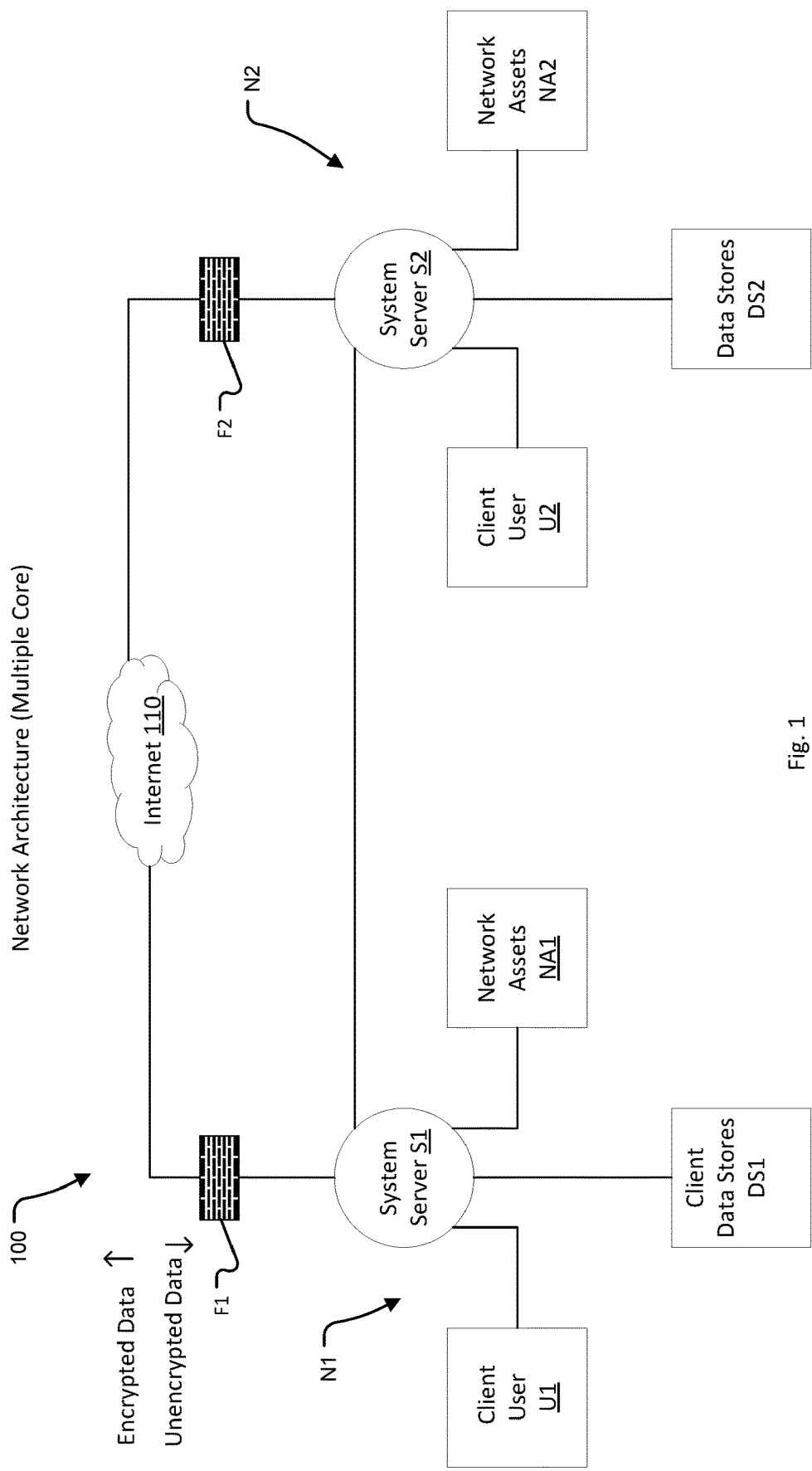
FIG. 1 is a block diagram showing one implementation of the cryptography system in which two system servers maintain an encrypted connection through a public network.

FIG. 1 shows an exemplary setup for the present system 100. Two servers S1, S2 communicate over a public network 110 such as the internet and function to establish an encrypted tunnel between two separated local area networks N1, N2.

As is common, each network N1, N2 is protected by a respective firewall F1, F2. Each network will typically include an assortment of user devices U1, U2 such as mobile computing devices, desktop computers, and laptop computers. In addition, each network will typically have various of network assets such as printers, cameras, building controls, phones, etc. The networks further commonly have data stores DS1, DS2 including data center database systems, email servers, and network attached storage (NAS) devices.

The servers S1, S2 of the system typically function using a purely symmetric encryption key methodology. Thus, the present system is compatible with many encryption schema and random key generators. In a current implementation the system uses AES encryption schema and System.security.cryptography. rngcryptoserviceprovider by Microsoft c# random key generator. Other alternative encryption schema are: DES, 3DES, Blowfish, Twofish, IDEA, or other symmetric block encryption methodologies. Other random key generators include: Bouncy Castle, and any other NIST approved key generator that outputs a random key.

The servers S1, S2 of the system 100 employ an encryption process that uses a single key replacement methodology to produce a shared ancestor key used to derive all subsequent keys. The ancestor key is replaced each time the session resets.

In other examples, the same encrypt process is employed between a server and a client device or two other devices.

Figure 2:
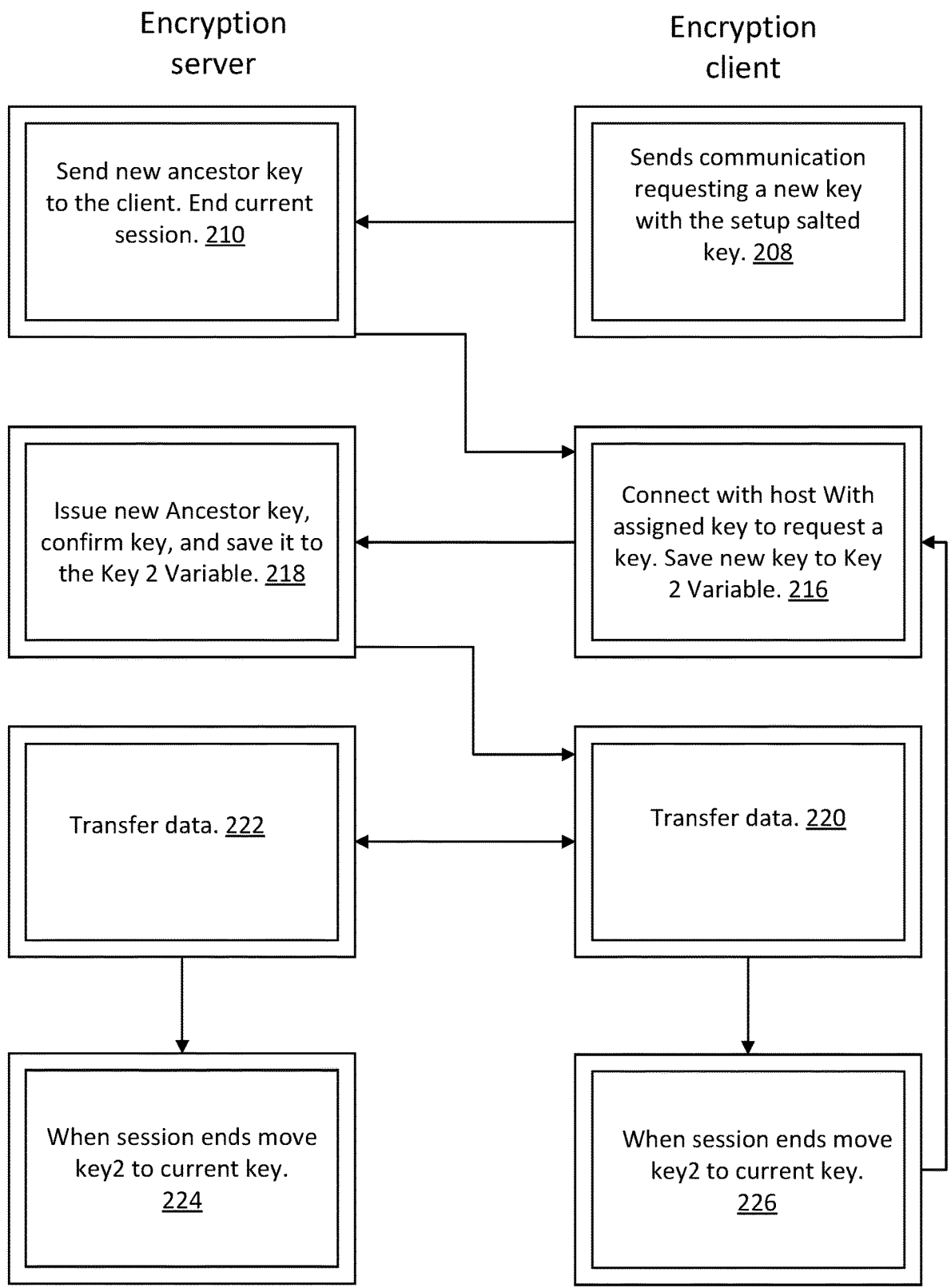
FIG. 2 is a flow diagram showing a session between a client and a system server.

FIG. 2 shows the basic encryption scheme. In general, one party functions as an encryption server and one functions as an encryption client. Every time an encryption client connects to the encryption server it requests a new ancestor key and confirms the key with the encryption server, and then saves it to its future key variable and begins to transfer session data. After the future key has been confirmed and saved, whenever a session goes down for any reason the process is repeated from the beginning. The current key is replaced by the future key and the process is repeated. The ancestor key is divided into two parts and used to create the session key and the packet key.

In more detail, in step 208 the encryption client sends a communication to the encryption server requesting a new key with the setup salted key.

Then in step 210, the encryption server sends a new ancestor key to the encryption client and this session is ended.

In step 216, the encryption client connects with the encryption server with the assigned key to request a key. This new key is saved to the server Key2 variable.

In step 218, the encryption server issues a new ancestor key, confirms the new ancestor key, and the client saves the new ancestor key to the Key2 variable.

The encryption server and client then transfer data to each other in steps 220, 222.

Then when the session is ended, the encryption server and client move Key2 to current key in steps 224, 226.

Figure 3:
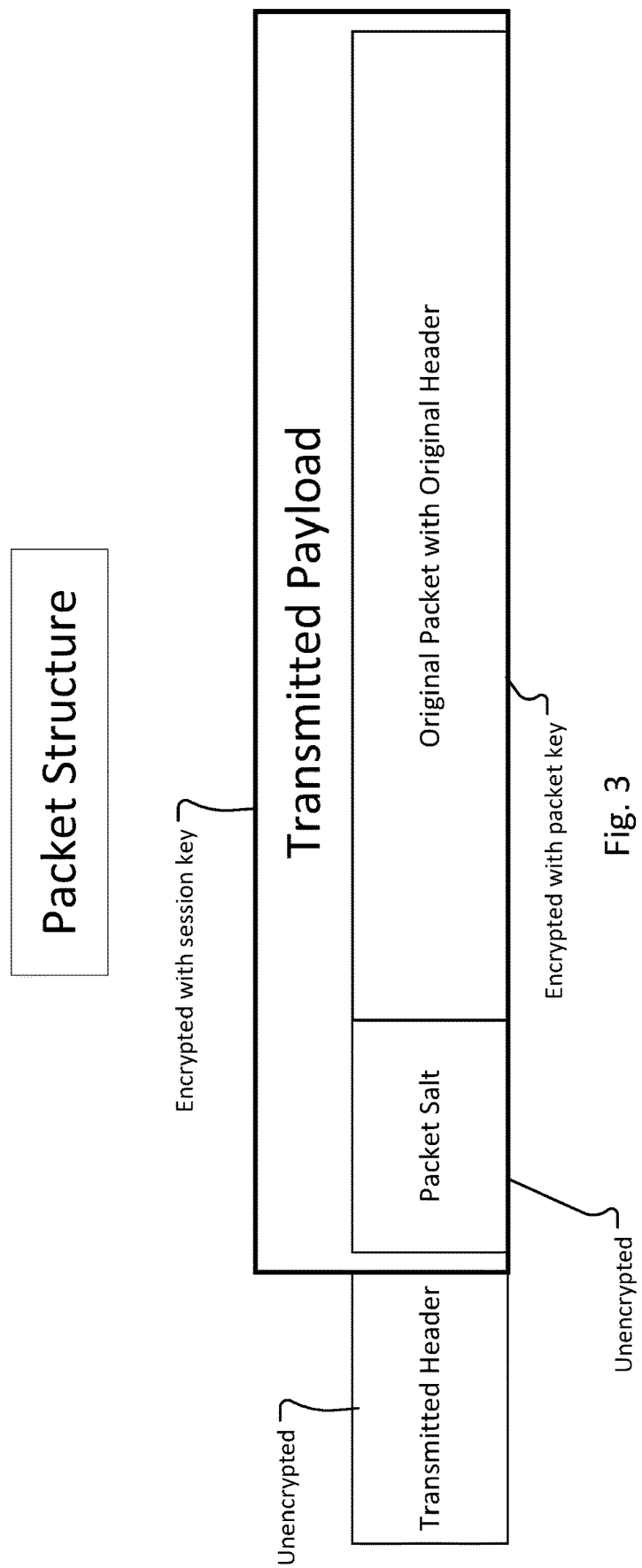
FIG. 3 is a block diagram showing the packet structure employed by one embodiment of the present system.

As shown in FIG. 3, the entire packet intending to be sent to the internet including the header is encrypted with the salted packet key then concatenated with the Salt and encrypted again with the session key. The encrypted packet is loaded into the payload of a packet with a standard IP Packet header and sent to the other party such as the server or client.

Once the packet reaches the server, for example, the server identifies the client that has initiated the current session with it, using the same method of dividing the known ancestor key to generate the same session and packet key. The session key is used to unwrap the first layer of encryption and separates the salt from the encrypted packet. It then uses the mathematical formula using the ancestor packet key and the salt to derive the packet key for each packet and decrypt the packet. The original packet is then readdressed to its destination using standard routing protocols. Upon receiving a response, the packet is readdressed back to the client system and the process is reversed using the current ancestor key and a new random salt generated for that packet.

Figure 4:
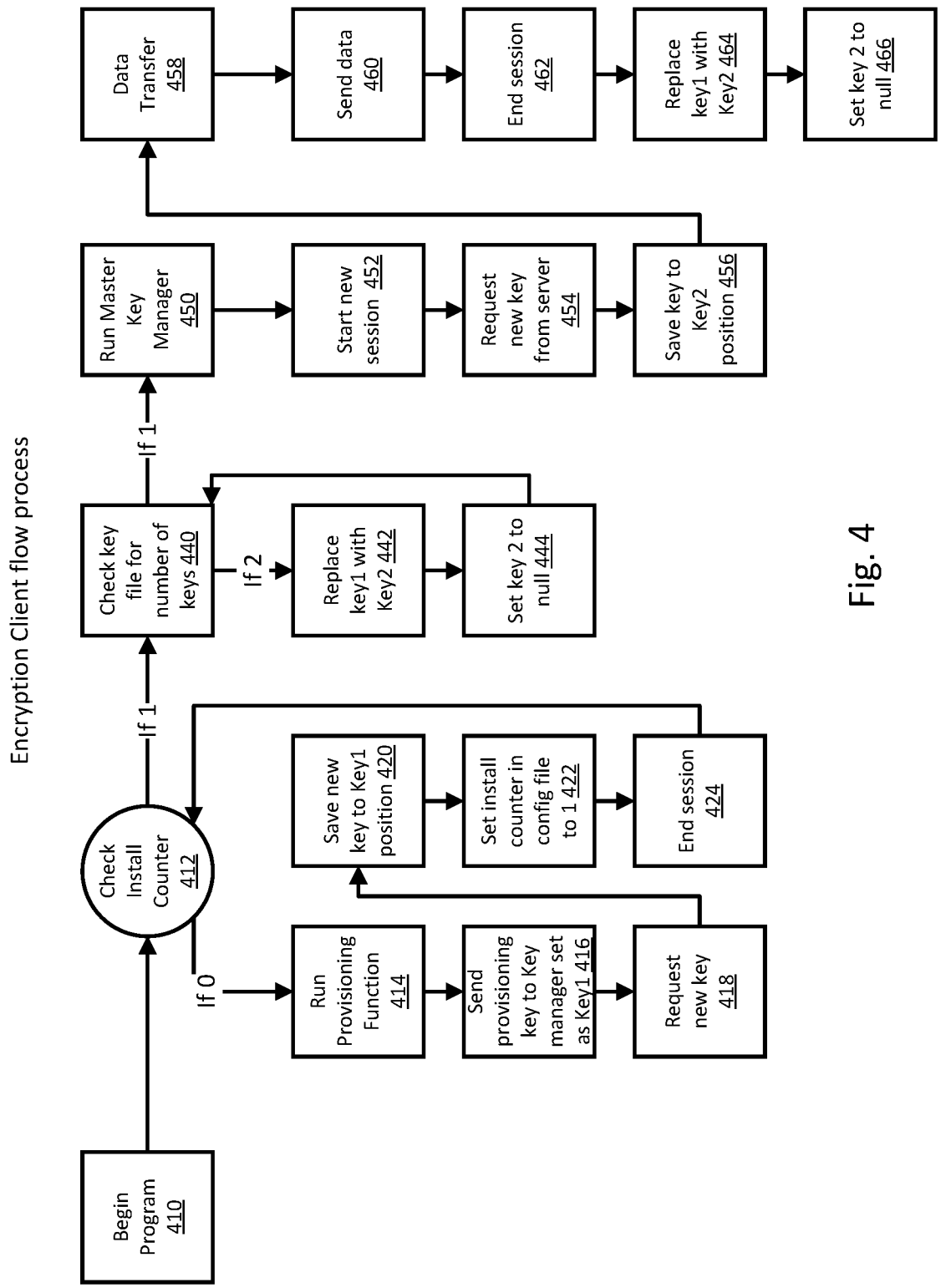
FIG. 4 is a flow diagram showing client process flow.

FIG. 4 shows the process executed by the encryption client.

In more detail, the program begins in step 410. In the first step, the encryption client checks its install counter in step 412. If this counter is 0 then it runs a provisioning function in step 414. Then in step 416, it sends a provisioning key to the key manager to set Key1.

Then in step 418, it requests a new key, and in step 420, it saves that new key to the Key1 position. It then sets the install counter in the config file to 1 in step 422 and ends the session in step 424.

If the install counter is 1, the process checks the key file for the number of keys in step 440. If this number is 2, Key1 is replaced with Key2 in step 442 and Key2 is set to null in step 444.

If the key file for the number is 1, then in step 450, the master key manager is run in step 450.

In more detail, the session is started in step 452. A new key is requested from the server in step 454. This new key is saved to Key2 in step 456. Data is then transferred in step 458 and step 460. Then the session is terminated in step 462. Key 1 is replaced with Key2 in step 464 and Key2 is set to null in step 466.

Figure 5:
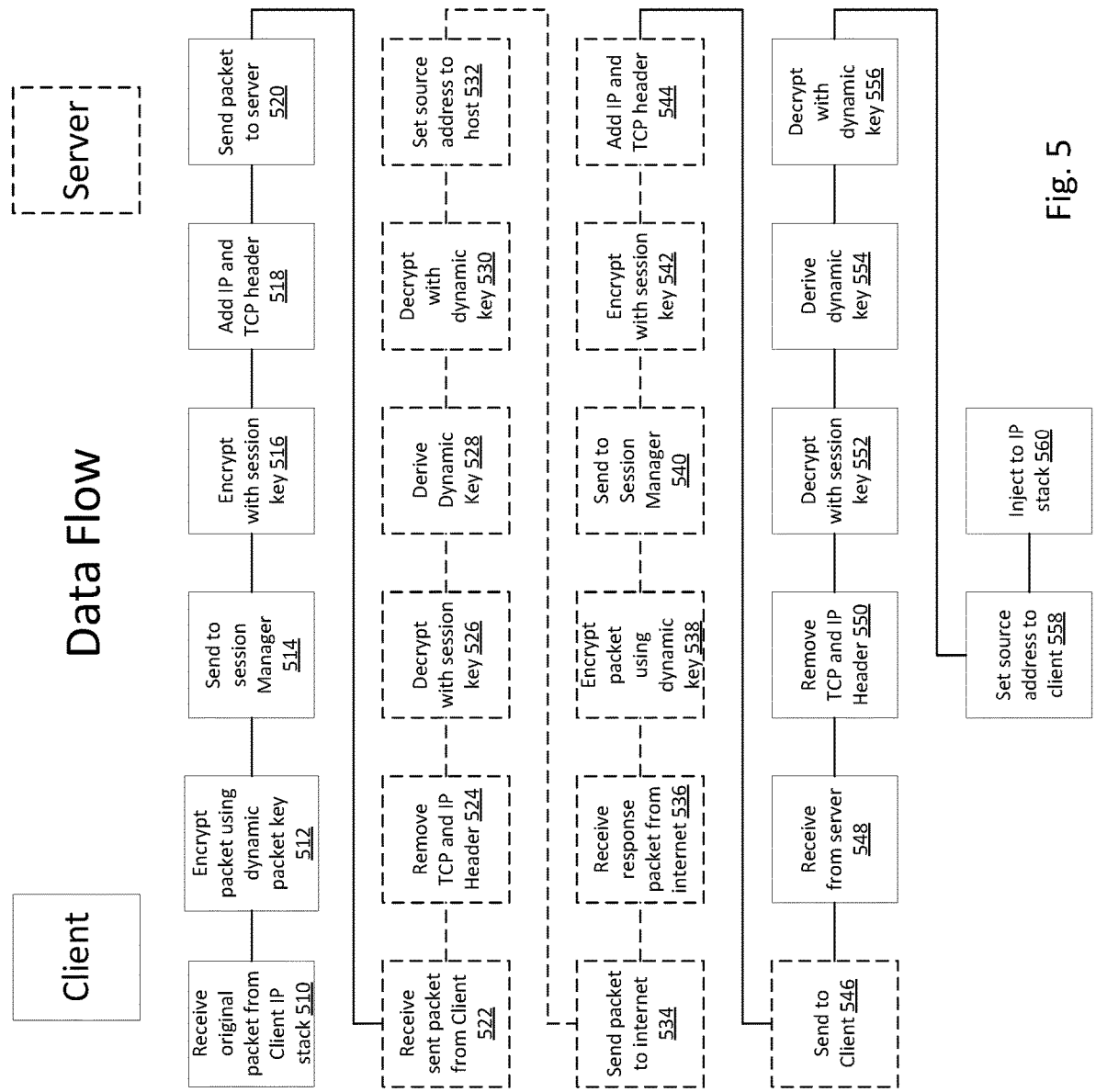
FIG. 5 is a flow diagram showing data flow.

FIG. 5 summarizes the data flow between the client and the server acting as a proxy for internet access from behind the encryption server.

In step 510, the client receives a packet from the client's IP stack. This original packet from the IP stack is then encrypted using the dynamic key in step 512. The encrypted original packet is sent to the session manager in step 514. The encrypted original packet is then encrypted with the session key in step 516. An IP and TCP header are then added in step 518 and the resulting send packet is sent to the server in step 520.

In step 522, the server receives the send packet from the client. The server removes the TCP and IP header in step 524. It decrypts the payload of the send packet with the session key in step 526. The dynamic key is derived in step 528. And the original IP stack packet is decrypted with the dynamic key in step 530. The source address of the IP stack packet is set to the host(server) in step 532. The packet is sent over the Internet as a proxy forward in step 534. The packet is received at the server and step 536. The packet is encrypted using the dynamic key in step 538. It is sent to the session manager in step 540. It is encrypted with the session key in step 542. The IP and TCP header are added in step 544. And it is sent back to the client as a proxy in step 556.

Then, the client receives the packet from the server in step 548. It removes the TCP and IP header and step 550. It decrypts the session key in step 552. The dynamic key is derived in step 554. The remainder of the package is decrypted with the dynamic key and step 556. The source address is set to the client in step 558. It is injected into the clients IP stack in step 560.

The system can be a stand-alone system but is also a foundational technology that can be used to enable secure communication in numerous ways including but not limited to:

Point to point secure communications:
    Single client to single server
    Multiple clients to single server
    Multiple clients to multiple servers
Point to hub to point relayed secure communication:
    Single client to single server to multiple clients
    Multiple clients to single server to single client
    Multiple clients to single server to multiple clients
    Single client to multiple server to multiple clients
    Multiple clients to multiple server to single client
    Multiple clients to multiple server to multiple clients
Point to hub to non-System connection (ex. Internet):
    Single client to single server to non-System connection
    Multiple clients to single server to non-System connection
    Multiple clients to multiple servers to non-System connection
Secure Mesh Configurations:
    Multiple client to multiple client with a self-elected dynamic server
    Multiple client to multiple client with an assigned support server The system can be implemented at different levels within the TCP/IP stack depending on the use case including but not limited to:

At the application layer:
    From an application to another application
    From an application to a server
    From an application to a data storage device
    From an application to an IOT device
    From an application to any network device (ex. Printer, fax, phone, etc.)
At the transport layer
    To capture all data coming on and off a system to implement universal encryption on a device for secure communication across any network
At the internet layer
    To capture network traffic at collection points within a network before transmission across the internet to secure offsite locations
    Router to router traffic can be encrypted with The system to create secure quantum resistant tunnels without the need for PKI or other asymmetric encryption protocols
At the physical layer
    Switches can be configured to encrypt VLAN, management ports, spanning ports or collect traffic to be forwarded to layer 3 devices in an encrypted tunnel.

The system Variants:
Variations that could be used are:
1) The creation of two keys instead of a single double sized key.
2) Multiple layers of encryption beyond a two-layer approach.
3) Placing the salt in an unencrypted portion of the packet header (ex. Options byte or TCP sequence number, etc.).

The system advantageously employs a dual encryption methodology that implements a different key for each session as well as a different key for each packet within each session. Each packet (including the very first packet) is first fully encrypted with the dynamic packet key that changes with each block of encryption and then it is encrypted again via the session key. This requires an attacker to run the entire key space for every packet key for each iterative attempt to break the session key. This is due to the fact that without both keys, an attacker is unable to determine if the session key is correct. Without the packet key, the data decrypted by the potential session key remains encrypted. With each underlying packet key being different than every other packet key there remains no way to find commonalities between packets to aid in decryption. The use of this methodology leads to an increase in quantum resistance while using industry standard non-quantum resistant symmetric encryption. This helps defeat quantum algorithms such as Grover's algorithm.

Entropy, or the randomness of the generated key, is critical in any defense of today's data. The higher the entropy (greater randomness) the stronger the encryption defense. A program designed to protect data should at a minimum have little to no decrease in the entropy offered by any cryptology method. The system significantly increases entropy through its dual distinct key management system over current industry standards. This added chaos therefore reduces the risk of quantum algorithms breaking current encryption methods.

The system does not need to use any asymmetric encryption for key exchange such as public key infrastructure (PKI). Instead, the system uses a dual encryption methodology that implements a different key for each session on a device as well as a different key for each packet within each session. Every system uses completely different keys. Effectively employed, the system encryption cycle begins below the protocol stack, as an endpoint device communicates back to a "trusted zone" such as a datacenter or security monitoring point. This effectively prevents access to the kernel. Within the trusted zone encrypted traffic either is decrypted and sent back within the internal network to access resources as allowed by security policies or, out to the internet in its original form.

Due to the nature of the dynamic key manager, the successful completion of a encrypt/decrypt cycle establishes undeniable attribution of every packet at a forensic level as only the two machines currently engaged in communication know the current session and packet key. When combined with an identity management system such as active directory, the result is absolute forensic level nonrepudiation of actions conducted from all machines on the network. Any Corruption or alteration of the packet either accidental or malicious results in rejection of the data and a request for retransmission from the application layer. With all these factors in place it is possible to determine that every usable encrypted packet that arrives at either an endpoint or trusted zone has perfect integrity.

The Dynamic key manager is completed by attaching a dynamic salt to the original packet and encrypting it with the current session key. The salt is then combined with the ancestor packet key to generate the current packet key for the originally transmitted packet.

In another example, the session key is also used in an unmodified form but the packet key is derived from the packet ancestor key for the current session and a locally generated random salt key that changes with every transmitted packet.

Figure 6:
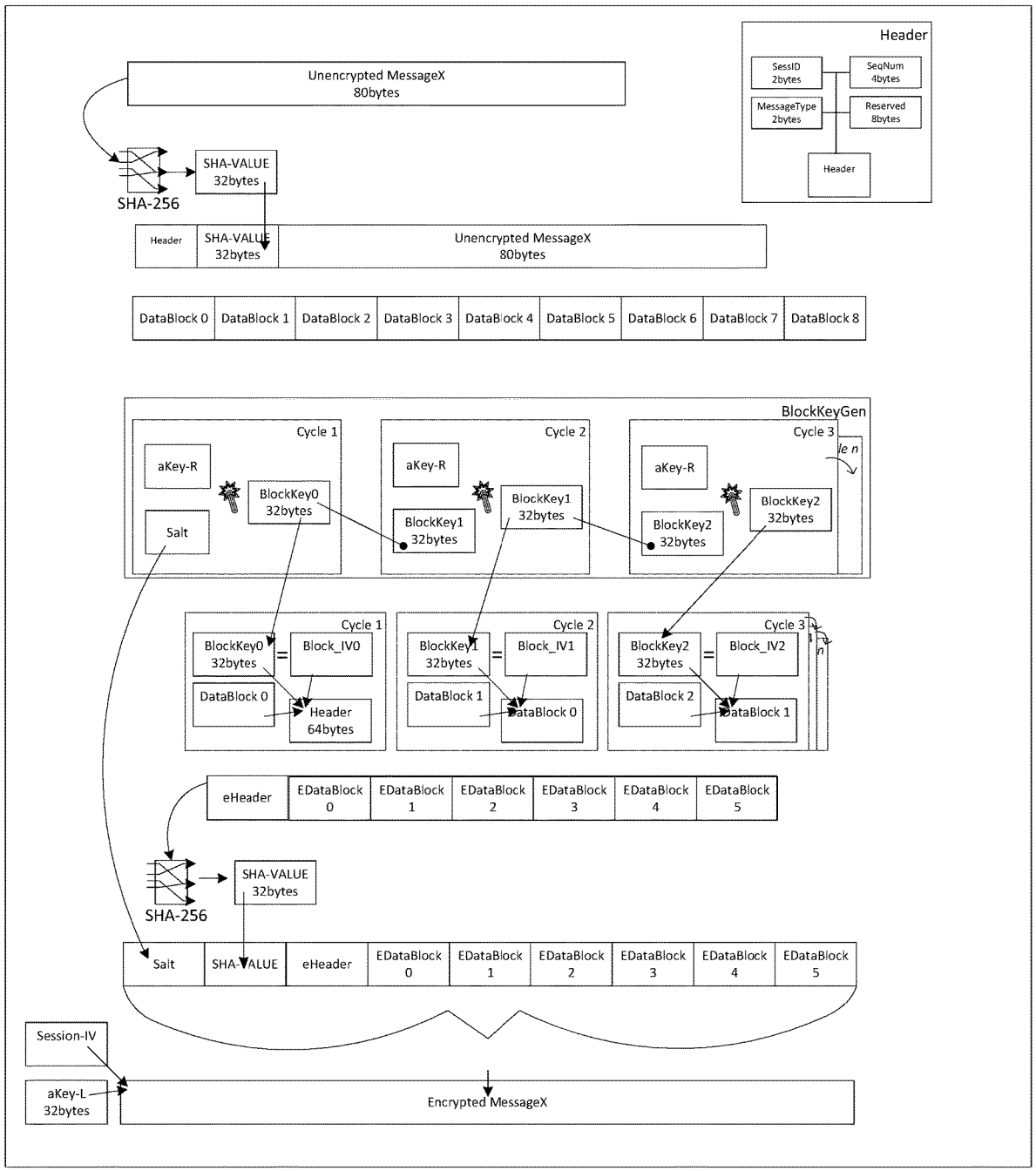
FIGS. 6 and 7 illustrate the encryption and decryption processes according to another embodiment.
Figure 7:
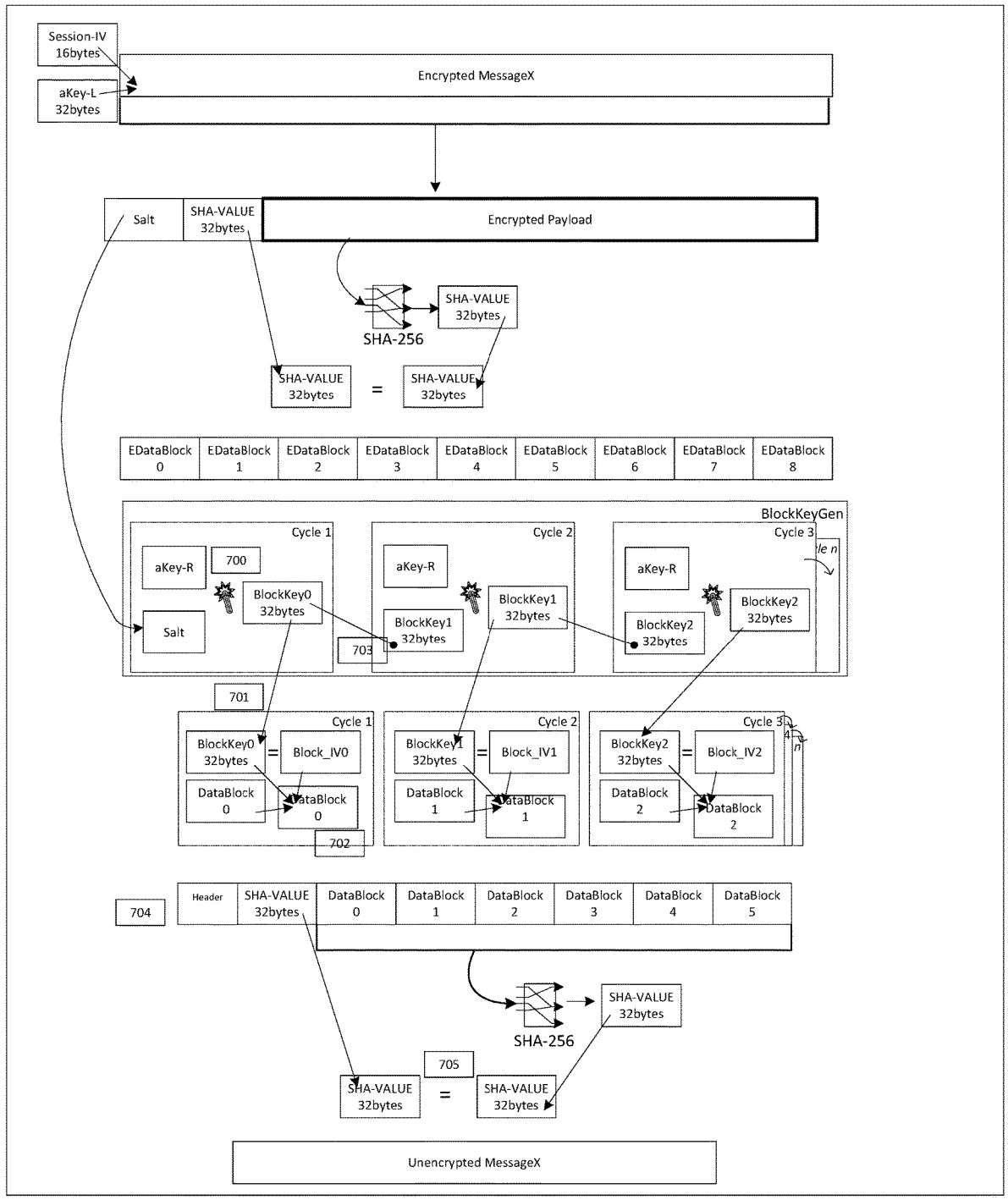

FIG. 6 illustrates the encryption and FIG. 7 illustrates the decryption processes.

In more detail, the process to follow to derive the key is as follows and is repeated independently for every block of encryption that is sent to the encryptor based upon the smallest single block possible. Steps include:

1. The packet salt is XOR'd with the packet ancestor key in step 700.
2. The resultant of step 1 is hashed with a strong cryptographic hashing algorithm in step 700.
3. The result from step 2 is sent the encryption module with a single block of data to be encrypted in step 701.
4. The result of the encryption replaces the current bytes of unencrypted data in step 702.
5. Perform step 1 through 4 with each subsequent block of data in the packet with the only modification to the process being that at step 1 the result from the previous cycle step 2 is used to replace the packet salt value in step 703.
6. After all data has been encrypted a hash value of the encrypted data is concatenated to the message along with the current packets salt and the encrypted data in step 704.
7. The result of step 6 is then encrypted with the ancestor session key for this session.
8. The result of step 7 is either stored or transmitted at this time.
9. The recipient of the packet then decrypts the message with the ancestor session key.
10. The result of step 9 then separates the salt, hash value, and encrypted data.
11. The transmitted hash value is then compared to a new local hash of the encrypted data from step 10 in step 705.
12. If the hash matches continue and if not discard the packet as corrupted (process can be used without a hash value if situation dictates a necessity).
13. Decrypt the encrypted data from step 10 starting the salt received from step 10 following the process directed in step 1 through step 5 except replace the encryption with the appropriate decryption process for the algorithm being used and return to step 700.

While this invention has been particularly shown and described with references to preferred embodiments thereof, it will be understood by those skilled in the art that various changes in form and details may be made therein without departing from the scope of the invention encompassed by the appended claims.

What is claimed is:

1. A cryptography method, comprising:
   a server providing a new shared ancestor key for each encrypted session;
   determining by a client a different session key for each encrypted session based on the shared ancestor key provided for the encrypted session;
   encrypting by the client each original packet with a different packet key for each packet within each session based on the shared ancestor key and a randomly generated salt for the packet; and
   wrapping by the client each encrypted original packet with a different session key for each session to produce a send packet.

2. The method of claim 1, wherein the encrypted original packet is combined with a packet salt prior to encryption with the session key.

3. The method of claim 2, wherein the packet salt is not encrypted with the packet key.

4. The method of claim 1, wherein the ancestor key is replaced each time a session resets.

5. The method of claim 1, wherein the packet key changes for each packet.

6. The method of claim 1, wherein the ancestor key is divided into two parts and used to create the session key and the packet key.

7. The method of claim 6, wherein the ancestor key is derived from the previous session key.

8. An encrypted tunnel system, comprising:
   two servers communicating over a public network, wherein the servers comprise hardware processors for executing instructions causing the servers to encrypt each original packet received from their respective local area networks with a different packet key for each packet within each session and wrap each encrypted original packet with a different session key for each session to produce a send packet that is transmitted over the public network to the other server, wherein there is a shared ancestor key for each encrypted session and the different session key for each encrypted session is based on the shared ancestor key, and the packet key is based on the shared ancestor key and a randomly generated salt for the packet.

9. The system of claim 8, wherein the encrypted original packet is combined with a packet salt prior to encryption with the session key.

10. The system of claim 9, wherein the packet salt is not encrypted with the packet key.

11. The system of claim 8, wherein the ancestor key is replaced each time a session resets.

12. The system of claim 8, wherein the packet key changes for each packet.

13. The system of claim 8, wherein the ancestor key is divided into two parts and used to create the session key and the packet key.

14. The system of claim 13, wherein the ancestor key is derived from the previous session key.

15. A cryptography method, comprising:
a server providing a new shared ancestor key for each encrypted session;
a client determining a different session key for each encrypted session based on the shared ancestor key provided for the encrypted session;
the client determining a different packet key for each packet within the encrypted session based on the shared ancestor key provided for the encrypted session and a randomly generated salt for the packet;
the client encrypting each original packet within the encrypted session using the packet key determined for the packet; and
the client combining each encrypted packet with the salt for the packet and wrapping the combined encrypted packet and salt using the session key determined for the encrypted session.

16. The method of claim 15, further comprising unwrapping each wrapped packet within the encrypted session using the session key determined for the encrypted session, extracting the salt and the encrypted packet from each unwrapped packet, deriving the packet key for each extracted encrypted packet based on the extracted salt for the packet and the shared ancestor key for the encrypted session, and decrypting each extracted encrypted packet using the derived packet key for the packet.

17. The method of claim 15, wherein the step of providing the new shared ancestor key for each encrypted session comprises, upon starting each encrypted session using a current ancestor key, providing a new shared ancestor key, saving the new shared ancestor key as a future key, and, upon ending each encrypted session, replacing the current ancestor key for the encrypted session with the saved future key for subsequent encrypted sessions.

* * * * *